United States Patent
Gerow et al.

[15] 3,663,250
[45] May 16, 1972

[54] WATER-INSENSITIVE BONDED ASBESTOS STRUCTURES

[72] Inventors: Stephen A. Gerow, Glen Mills, Pa.; Verne Wesley Weidman, Wilmington, Del.

[73] Assignee: E. I. du Pont de Nemours and Company, Wilmington, Del.

[22] Filed: June 1, 1970

[21] Appl. No.: 42,557

[52] U.S. Cl. ..................................106/84, 252/62
[51] Int. Cl. ......................C04b 35/16, C04b 43/04
[58] Field of Search ............106/40, 75, 84; 252/62

[56] References Cited

UNITED STATES PATENTS 1,966,069   7/1934   Kliefoth..................................106/75
1,976,946   10/1934   Kliefoth..................................106/75

*Primary Examiner*—James E. Poer
*Attorney*—Don M. Kerr

[57] ABSTRACT

Water-insensitive, insulating structures of fibrous asbestos bonded by an in situ-produced water-insoluble crystalline reaction product of asbestos and sodium or potassium silicate. Structures are obtained by mixing the fibrous asbestos with an aqueous solution of alkaline ionic silicate to make a damp fibrous mass, compacting the mass into a coherent article, and curing the article under controlled temperature and humidity conditions so as to maintain a water level in the article of at least 10 weight per cent, based on solids, for a period of time sufficient to produce the crystalline binder. After curing, the structures are dried, if necessary, to a water content below 20 percent based on solids.

5 Claims, No Drawings

3,663,250

WATER-INSENSITIVE BONDED ASBESTOS STRUCTURES

BACKGROUND OF THE INVENTION

This invention relates to water-insensitive, rigid, low density, highly crystalline asbestos-silicate structures and processes for their preparation.

Under the presently available methods of preparing acoustical and thermal insulating materials, alkaline ionic silicate binders have not proven satisfactory where such materials are subsequently exposed to humid conditions or come in contact with water. Alkaline ionic silicate bonded asbestos compositions are highly hygroscopic, causing them to warp, sag, and otherwise lose their structural and dimensional stability under such moist conditions. The conventional technique for meeting this problem has been to add a third ingredient to the composition to stabilize the silicate or the firing of the composition after molding, or both.

Limited success in improving the water-insensitivity of silicate bonded filler materials has been achieved by the addition of such third ingredients as clay, U.S. Pat. No. 3,203,813, sodium chloride, U.S. Pat. No. 2,600,812, caustic U.S. Pat. No. 3,445,253, alum, U.S. Pat. No. 2,705,198, or urea, U.K. Pat. No. 1,059,832, to the composition.

The prior art also discloses the stabilization of similar silicate bonded compositions by firing with conventional thermal, U.S. Pat. No. 3,445,253, and microwave energy, Baker, J.E., *Silicate Foam for Airdrop Cushioning*, Clearinghouse for Federal Science and Technology Publications, U.S. Department of Commerce (May 1968).

Conventional silicate bonded asbestos products, in addition to being water-sensitive, present a potential health hazard to both the personnel involved in their manufacture and installation, and the ultimate consumers of such products. There is apparently a tendency for asbestos filler materials to break down somewhat during manufacture and handling, into fine toxic dust which can cause serious respiratory impairment and even death when inhaled by humans.

We have surprisingly discovered a method for preparing water-insensitive silicate bonded asbestos products having reduced emissions of such toxic dust particles. The novel products of this invention must comprise at least 75 percent fibrous asbestos fillers by weight. The alkali ionic silicate portion of these products also have a critical silica to alkali concentration and solids content. The process for preparing such materials requires that the formed materials be cured during their manufacture to enable the asbestos portion of the filler to react with the silicate to produce a water-insoluble crystalline reaction product which is believed to render such cured article water-insensitive and relatively dust-free.

SUMMARY OF THE INVENTION

In summary, the water-insensitive, relatively dust-free products of this invention consists essentially of a fibrous asbestos filler bonded by an in situ-produced water insoluble crystalline reaction product of asbestos and sodium or potassium silicate and are made by the process comprising steps (a) to (c) in sequence:

a. mixing 1 to 4 parts filler materials, having at least 75 percent by weight reactive fibrous asbestos, with 8 to 1 parts of an aqueous solution of sodium silicate, having an $SiO_2:Na_2O$ weight ratio of 3:1 to 4:1 and a solids content of 28 to 34 weight per cent, or potassium silicate, having an $SiO_2:K_2O$ weight ratio of 2:1 to 2.6:1 and a solids content of 24 to 30 weight per cent;

b. forming the mixture into a coherent article by compression; and c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

DESCRIPTION OF THE INVENTION

Physical Properties of Product

The most surprising physical properties of the bonded asbestos-silicate products of this invention is the relatively high degree of water-insensitivity and relatively low degree of dust emissions such materials possess when compared to the conventional silicate bonded asbestos products presently known and available.

In order to quantitatively define one of the properties of this product and dramatize this distinction over such conventional materials, a severe but effective "water test" was developed. In this test, the cured samples were cut into specimens having dimensions $3 \times 3 \times 1$ inch thick. One or more specimens were reserved as controls, while an equal number of specimens was selected for water exposure.

All specimens were weighed and their dry densities were calculated. The specimens for water exposure were then suspended completely submerged in ~2,500 ml. of water. Heat was applied to the containers and the water temperature was gradually taken to the boiling point. The specimens were exposed to boiling water for an 8 hour period, after which the heat source was removed. The specimens were allowed to remain completely submerged in the same water for an additional 16 hours.

At the conclusion of the 24 hour immersion, the samples were removed and oven dried at a temperature of 165° F. overnight. During the following morning, the dried samples that had been exposed to water were again weighed and their dry densities determined. Weight loss in percent on an original dry basis was calculated.

Compressive strengths of all samples, both water exposed and the controls, were determined on an Instron Testing Machine. Values for compressive strength at 5 percent deformation in lb./sq.in. were obtained on all specimens. Comparisons were made on the basis of water-exposed vs. unexposed (control) specimens.

Water resistance is an extremely critical property of silicate-bonded systems. This test method provides an accurate means of measuring water resistance. In a water-sensitive system, the sample disintegrates soon after immersion in water, and usually before the temperature reaches the boiling point.

Examination of particles of the cured products of this invention under a petrographic microscope, having a polarized light source, reveals sharp differences in the bire-fringent patterns of such materials when compared to crystal patterns of uncured silicate bonded asbestos materials prepared by processes omitting the critical curing step of our process.

This modified crystalline make-up of the silicate bonded asbestos products of this invention is believed to account in part for the enhancement of water-insensitivity and the reduction in dust emissions of these products.

The dry densities (less than 10 weight per cent water content) of the products of this invention will vary depending upon the degree of compaction and the initial density of the mixture. The dry densities of the products of this invention should not exceed 70 lbs./cu.ft. and will preferably range from 30 to 70 lbs./cu.ft.

STARTING MATERIALS a. Fillers

The filler component of the products of this invention can comprise reactive fibrous asbestos by itself, or reactive fibrous asbestos and other inert fillers in admixture; the reactive fibrous asbestos comprising at least 75 percent of any such admixture.

1. Reactive Fibrous Asbestos

Derived from the mineral serpentine, chrysotile asbestos is an inorganic hydrous magnesium silicate having the formula $3 MgO \cdot 2 SiO_2 \cdot 2 H_2O$, containing 12–15 percent free water. This asbestos material is characteristically fibrous, each individual particle being both hollow and cylindrical and having exceptionally high tensile strength. The native asbestos fibers can range in length from 2 inches to fractions of an inch.

Because of its unusual strength and flexibility, native asbestos can also be spun into much longer fibers and filaments.

Although chrysotile asbestos comprises over 90% of the total asbestos production in the United States, and is preferred for the products of this invention, other less prevalent types of asbestos, such as crocidolite and amosite, can also be used and their products will also be satisfactory.

Analysis and comparison of the chemical and physical properties of these three types of asbestos is given below in the following table[1]:

| Property | Chrysotile | Crocidolite | Amosite |
|---|---|---|---|
| Chemical formula | $Mg_6[(OH)_4Si_2O_5]_2$ | $Na_2MeFe_5[(OH)Si_4O_{11}]_2$ | $MgFe_6[(OH)Si_4O_{11}]_2$ |
| Color | White, gray, green, yellowish | Blue | Gray, yellow, brown. |
| Hardness, mohs | 2.5–4 | 4 | 5.5–6.0. |
| Tensile strength, p.s.i | 824,000 max / 281,000–436,000 | 876,000 max / 469,000–605,000 | 287,000 max. / 148,000–203,000. |
| Modulus of elasticity, p.s.i | $23.2 \times 10^6$ | $27.1 \times 10^6$ | $23.6 \times 10^6$. |
| Fusion point, °F | 2,770 | 2,180 | 2,550. |
| Specific heat, B.t.u./lb., °F | 0.266 | 0.201 | 0.193. |
| Specific gravity | 2.4–2.6 | 3.2–3.3 | 3.1–3.25. |
| pH | 10.3 | 9.1 | 9.1. |
| Refractive index | 1.50–1.55 | 1.7 | 1.64. |
| Texture | Soft-semibrittle | Soft-semibrittle | Coarse, brittle. |
| Fiber diameter, A | 180–300 | 600–900 | 600–900. |
| Surface area, BET m.²gm | 17–60 | 9–10.5 | 8–9. |
| Coeff. of thermal cubical expan. in.³/in.³ | $5 \times 10^{-5}$ | | |
| Electric charge in water slurry | + | | |
| Isoelectric point | 11.3–11.8 | | |

[1] 1968 Modern Plastics Encyclopedia.

The fibrous asbestos materials used in the products of this invention are characterized as "reactive" in order to distinguish them from the other inert materials that can also be present in the starting materials. Apparently, the fibrous asbestos fraction of these filler materials reacts with the aqueous silicate to produce a water insoluble crystalline material which is believed to contribute to the water-insensitivity of the ultimate product. This water insoluble crystalline material is dispersed throughout the product and apparently accounts for the unusual birefringent patterns observed in microscopic examination.

This reaction between significant amounts of asbestos and aqueous silicate occurs during the curing step in the process of this invention. Past attempts at producing water-insensitive structural materials of the type produced by the process of this invention have proven unsuccessful because the critical curing step of this process was not known or appreciated by the art.

2. Inert Fillers

Various inert, water insoluble fillers can be included in the filler materials used in the products of this invention. These inert materials can be present in the filler in a concentration of about 25 percent of the weight of the total filler component, and can be omitted completely without any effect on water-insensitivity.

The inert fillers which can be added to the filler component of the products of this invention can comprise particulate material, such as the clays, gypsum, wollastonite, fly ash, vermiculite, or pigmentary potassium titanate, and/or fibrous fillers, such as nylon, polypropylene, rayon, cellulosic materials, metal whiskers or mesh, alumino-silicate fibers, rockwool, slagwool, and the like.

Inert fillers of the type described above can be added to the products of this invention to provide structural reinforcement, e.g. mineral wools, or reduce the sound transmittance of an acoustical product, e.g. vermiculite.

b. Aqueous Alkaline Ionic Silicates

The aqueous silicate reactants used in the products of this invention are water soluble compounds which are substantially completely ionized in aqueous solution. The weight ratio of respective ions in solution is usually expressed in terms of the relative concentration of $SiO_2:M_2O$ in aqueous solution, where M is Na or K.

For sodium silicate binders, the preferred weight ratio of $SiO_2:Na_2$ in aqueous solution ranges from 3:1 to 4:1. Weight ratios of $SiO_2:Na_2O$ below 3:1 do not produce water-insensitive structural material by the process of this invention, and weight ratios above 4:1 are economically unattractive.

The most preferred weight ratio of $SiO_2:Na_2O$ for the aqueous sodium silicate solutions used in the process of this invention is 3.25:1.

Structural materials made by the process of this invention in which sodium silicate is one of the reactants may undergo efflorescence in moist or humid environments, depending on the completeness of curing; however, this surface chalking of structural materials affects only their appearance, not their other physical properties.

For potassium silicate binders, the preferred weight ratio of $SiO_2:K_2$ in aqueous solution ranges from 2:1 to 2.6:1.

Structural materials made by the process of this invention in which potassium silicate is used as the binder do not undergo efflorescence and are therefore preferred for the manufacture of articles such as acoustical ceiling tile, where esthetic appearance is important.

The silicate portion of the products of this invention can comprise a mixture of both sodium and potassium silicates.

The solids content of the sodium silicate solutions used in the products of this invention must range from 28 to 34 percent and the solids content of the potassium silicate solutions must range from 24 to 30 percent. Silicate solutions having a solids content below this minimal level do not produce structures of the requisite degree of water-insensitivity, while solutions having concentrations in excess of the upper limit yield products which crack.

The preferred solids content of a 3.25 weight ratio sodium silicate solution is approximately 31.6 percent.

MIXING

One to four parts filler materials are mixed with eight to one parts aqueous silicate solution until uniformly dispersed among each other. The preferred weight ratio of materials in this mixture comprises 4.22 parts filler to 1 part alkaline ionic silicate.

The type of mixing equipment can vary depending upon the volume of the mixture and the type of inert filler material present in the filler fraction of the mixture.

A Hobart Mixer with a wire ship beater proves satisfactory for smaller laboratory size batches, however, a kneader-type mixer is recommended for larger batches. Ribbon blenders also prove satisfactory for mixing these larger batches.

If the filler fraction of the starting materials contains a fibrous reinforcing filler, as for example mineral wool, experience has indicated that combining such materials in a pugmill is preferred to the blenders and mixers previously described.

FORMING

After mixing, the starting materials appear as a damp granular powder which can be dry-pressed by standard ceramic processing techniques into a wide variety of shapes.

The minimum compaction pressure necessary to compress the damp granular mixture into a coherent shape is approximately 100 lbs./cu.in. with pressures of 120 to 300 lbs./sq.in. preferred.

The mixture should not be compacted beyond a dry density of 70 lbs./cu.ft. and a dry density between 30 and 70 lbs./cu.ft. is preferred.

Because the fibrous asbestos fillers of this granular mass are hollow cylinders, they are readily compressible at these higher pressures. Compaction pressure in excess of the upper limits set for the process of this invention (300 lbs/cu.in.) should be avoided to the extent that these pressures destroy the cylindrical nature of the fibers. Compaction at these elevated pressures may also displace the moisture along the fibrous interface of the asbestos filler, and thereby upset the interaction between the asbestos and aqueous silicate, so necessary in the formation of water-insensitive products.

Compaction pressures in the neighborhood of 100 lbs./sq.in. are preferred for the process of this invention.

CURING

Once the damp granular powder is compressed into a coherent low density shape, the compacted mass must be cured in a controlled environment in order to maintain the water content of the composition at a level of at least 10 percent of the weight of the water-free solids of the composition.

Because water content is so critical in the curing step of the process, it is necessary to compress the damp granular powder within a short period after admixture, or take steps to minimize water loss prior to compaction.

The maintenance of a minimum water content in the compacted fibrous mass provides a reaction medium for the interaction of the reactive fibrous asbestos and the silicate. Firing or oven drying of the structural material immediately or shortly after compaction, ordinarily reduces the water content of the system below the critical level required, and therefore the reaction between these two materials is prematurely curtailed.

By maintaining the water content of the system at or above the minimum level required, the asbestos and the silicate will react to form a water insoluble crystalline product which is believed to impart water-insensitivity to the cured composition.

The rate and extent of formation of water insoluble crystalline material appears to be a function of water content, time and temperature.

Water content is critical to the rate at which the crystalline reaction product is formed only to the extent that it must not fall below about 10 percent of the weight of the water-free solids. Compacted structures having a water content in excess of this minimum level do not appear to have an accelerated rate of crystal formation, nor a greater overall amount of crystalline material, other conditions being equal.

Apparently the longer the compacted structural materials are allowed to cure, the greater the concentration of water insoluble crystalline binder formed. For example, if a sample is cured under ambient conditions, 50 percent relative humidity and 75° F., the minimum interval necessary to obtain adequately cured structures is 3 days. The longer the compacted composition is cured, the greater the compressive strength of the materials obtained.

The temperatures at which the compacted structural material is cured can range from approximately 50° to 400° F.

Curing at temperatures of from about 275° to 400° F. is preferred for the process of the invention. Of course, when heat is applied to the compacted composition to accelerate curing, special precautions are necessary to insure that the water content of the article is maintained at the minimum level of 10 percent.

Evaporation of water from the structure can be controlled by adjustment of atmospheric pressure within the heating unit and/or by heating in the presence of steam.

Curing can also take place is excess of 400° F., however, even though technically possible, the special equipment, the superheated steam and other factors make such an operation commercially impractical.

Prior to curing, the compacted composition can be briefly treated with carbon dioxide vapor to enhance the early green strength of the article, however, treatment with carbon dioxide to cause setting of the silicate on the surface of article is not essential to the process of this invention.

Under normal atmospheric conditions, the carbon dioxide in the air will also react with the surface alkali of the green article.

DRYING

After curing, the product is dried, where necessary, to reduce its water content below 20 percent of the weight of its water-free solids.

Preferably, the product is dried even further, until its water content drops below 10 percent, thereby arresting the reaction between the asbestos and the silicate.

Drying is ordinarily accelerated by heating, preferably in the range of about 165°-220° F., until the water content is reduced to the desired level.

The structural materials produced by the process of this invention can be used to prepare articles having a variety of shapes and properties. The physical properties of the structures vary depending upon type of auxiliary inert filler material also present in the filler fraction of the mix. Because of the unique qualities of the product produced by the process of this invention, it can be used in the manufacture of high temperature thermal insulation, non-combustible, water-insensitive acoustical ceiling tile, core materials for wall structures, steel ingot mold parts, foundry risers, and friction materials.

The examples which follow are a few specific embodiments of the disclosure of this invention.

Parts and percentages in these examples are by weight unless otherwise stipulated.

EXAMPLE 1

A mixture consisting of 300 parts by weight of Du Pont's No. 9 Grade 3.25 $SiO_2:Na_2O$ ratio sodium silicate solution, (8.9 percent $Na_2O$, 29.0 percent $SiO_2$, 62.1 percent $H_2O$) of specific gravity 41.6°Be' at 60° F. and having an approximate viscosity of 345 ± 85 cp. at 77° F., and 60 parts by weight of water is prepared, and this solution is blended in a Hobart Mixer kettle with 480 parts by weight of the chrysotile form of asbestos fiber (Johns-Manville Grade No. 706 - Code 6D20). A specimen (dimensions 6 × 6 × 1 inch thick) is formed by pressing 836 g. of the above-described mixture at a pressure of ~ 100 p.s.i. in a suitable mold. The specimen is cured by drying in air for 7 days at a temperature of 75° F. and a relative humidity of ~ 50 percent. Oven drying at a temperature of 165°-220° F. for 24 hours completes the curing operation.

A water-resistant, incombustible, rigid, siliceous structure is obtained, which is further characterized below. The property of resistance to water was determined using the "water test." Properties:

|  | Dry density, pcf. | | Weight loss after boiling water test, percent | Crush strength at 5% deformation, p.s.i. |
|---|---|---|---|---|
|  | No water exposure | After water test | | |
| Control | 56.5 | | | 178 |
| Water | 59.9 | 51.9 | 13.3 | 67 |

EXAMPLE 2

This example illustrates the failure to find a reaction between clay, which is an alumino-silicate mineral, and sodium silicate as compared to the reaction discovered between asbestos and sodium silicate to yield a water-insensitive crystalline, siliceous binder phase.

A mixture consisting of 375 parts by weight of Du Pont's No. 9 Grade 3.25 $SiO_2:Na_2O$ ratio sodium silicate solution and 75 parts by weight of water is prepared and blended in a Hobart Mixer kettle with 720 parts by weight of clay (PVR clay from Georgia Kaolin Co.). A specimen (dimensions 6 × 6 × 1 inch thick) is formed by pressing 1,000 g. of the above-described mixture in a suitable mold. The specimen is cured by drying in air for 7 days at a temperature of 75° F. and a relative humidity of ~ 50%. Oven drying at a temperature of 165°–220° F. for 24 hours completes the curing operation.

A heavy water-sensitive siliceous structure is obtained which is further characterized below.

| | Dry density, pcf. | | Weight loss after boiling water test, percent | Crush strength at 5% deformation, p.s.i. |
|---|---|---|---|---|
| | No water exposure | After water test | | |
| Control | 80.2 | | | 367 |
| Water | 79.0 | (Disintegrated in boiling water) | | |

EXAMPLE 3

This example also illustrates the failure to find a reaction between wollastonite, which is a naturally occuring siliceous mineral composed of calcium silicate, and sodium silicate as compared to the reaction discovered between asbestos and sodium silicate to yield a water-resistant, crystalline, siliceous binder phase.

A mixture consisting of 300 parts by weight of Du Pont's No. 9 Grade 3.25 $SiO_2:Na_2O$ ratio sodium silicate solution and 60 parts by weight of water is prepared and blended in a Hobart Mixer kettle with 480 parts by weight of wollastonite powder ("Cabolite" F-1 from Cabot Corp.). A specimen (dimensions 6 × 6 × 1 inch thick) is formed by pressing 830 g. of the above-described mixture in a suitable mold. The specimen is cured by drying in air for 7 days at a temperature of 75° F. and a relative humidity of ~ 50 percent. Oven drying at a temperature of 165°–220° F. for 24 hours completes the curing operation.

A heavy water-sensitive siliceous structure is obtained which is further characterized below.
Properties:

| | Dry density, pcf. | | Weight loss after boiling water test, percent | Crush strength at 5% deformation, p.s.i. |
|---|---|---|---|---|
| | No water exposure | After water test | | |
| Control | 60.4 | | | 206 |
| Water | 61.9 | (Disintegrated in boiling water) | | |

EXAMPLE 4

This example further illustrates the failure to achieve a reaction between a siliceous mineral, namely vermiculite, and sodium silicate, as compared to the reaction revealed in this invention between asbestos and sodium silicate to yield a water-insensitive crystalline, siliceous bond.

A mixture consisting of 200 parts by weight of Du Pont's No. 9 Grade 3.25 $SiO_2:Na_2O$ ratio sodium silicate solution and 40 parts by weight of water is prepared and blended in a Hobart Mixer kettle with 160 parts by weight of vermiculite (No. 2 Grade from Zonolite Division of W. R. Grace and Co.). A specimen (dimensions 6 × 6 × 1 inch thick) is formed by pressing 350 g. of the above-described mixture in a suitable mold. The specimen is cured by drying in air for 7 days at a temperature of 75°F. and a relative humidity of ~ 50 percent. Oven drying at a temperature of 165°–220° F. For 24 hours completes the curing operation.

A low-density, water-sensitive siliceous structure is obtained which is further characterized below.
Properties:

| | Dry density, pcf. | | Weight loss after boiling water test, percent | Crush strength at 5% deformation, p.s.i. |
|---|---|---|---|---|
| | No water exposure | After water test | | |
| Control | 22.0 | | | 18 |
| Water | 22.1 | (Disintegrated in boiling water) | | |

We claim:

1. A water-insensitive structural material consisting essentially of reactive fibrous asbestos bonded by an in situ-produced water insoluble, crystalline reaction product of asbestos and sodium or potassium silicate, and made by the process comprising steps (a) to (c) in sequence:
   a. mixing 1 to 4 parts filler materials, having at least 75 percent by weight reactive fibrous asbestos, with 8 to 1 parts of an aqueous solution of sodium silicate, having an $SiO_2:Na_2$ weight ratio of 3:1 to 4:1 and a solids content of 28 to 34 weight per cent, or potassium silicate, having an $SiO_2:K_2O$ weight ratio of 2:1 to 2.6:1 and a solids content of 24 to 30 weight per cent;
   b. forming the mixture into a coherent article by compression; and
   c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

2. The water-insensitive structural material, made by the process comprising steps (a) to (c) of Claim 1, wherein step (a) comprises:
   mixing 4.22 parts filler materials, having at least 75 percent by weight reactive fibrous asbestos, with 1.0 part 31.6 weight per cent aqueous solution of sodium silicate, having an $SiO_2:Na_2O$ weight ratio of 3.25:1.

3. A water-insensitive structural material con-sisting essentially of reactive fibrous asbestos bonded by an in situ-produced water insoluble crystalline reaction product of asbestos and a solution of sodium and potassium silicate, and made by the process comprising steps (a) to (c) in sequence:
   a. mixing 1 to 4 parts filler materials, having at least 75 percent by weight reactive fibrous asbestos, with 8 to 1 parts of an aqueous silicate solution of sodium silicate, having an $SiO_2:Na_2O$ weight ratio of 3:1 to 4:1 and a solids content of 28 to 34 weight per cent, and potassium silicate, having an $SiO_2:K_2O$ weight ratio of 2:1 to 2.6:1 and a solids content of 24 to 30 weight per cent;
   b. forming the mixture into a coherent article by compression; and
   c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

4. A process for preparing water-insensitive structural materials having reactive fibrous asbestos bonded by an in situ-produced water insoluble crystalline reaction product of asbestos and sodium or potassium silicate, said process comprising steps (a) to (c) in sequence:
   a. mixing 1 to 4 parts filler materials, having at least 75 percent by weight reactive fibrous asbestos, with 8 to 1 parts of an aqueous solution of sodium silicate having an $SiO_2:Na_2$ weight ratio of 3:1 to 4:1 and a solids content of 28 to 34 weight per cent, or potassium silicate, having an $SiO_2:K_2O$ weight ratio of 2:1 to 2.6:1 and a solids content of 24 to 30 weight per cent;

b. forming the mixture into a coherent article by compression; and c. curing the coherent article under controlled temperature and humidity conditions, whereby the water content of said article is maintained at a level of not less than about 10 percent of the weight of the water-free solids in said article, for a period sufficient to produce an article capable of withstanding 8 hours of immersion in boiling water.

5. A method for reducing the quantity of dust emissions for asbestos-silicate products comprising the steps (a) to (c) in sequence:

a. mixing 1 to 4 parts filler materials, having at least 75 percent by weight reactive fibrous asbestos, with 8 to 1 parts of an aqueous solution of sodium silicate, having an $SiO_2:Na_2$ weight ratio of 3:1 to 4:1 and a solids content of 28 to 34 weight per cent, or potassium silicate, having an $SiO_2:K_2O$ weight ratio of 2:1 to 2.5:1 and a solids content of 24 to 30 weight per cent;

b. forming the mixture into a coherent article by compression; and c. curing the coherent article under controlled temperature and humidity conditions, whereby the water content of said article is maintained at a level of not less than about 10% of the weight of the water-free solids in said article, for a period sufficient to produce an article capable of withstanding 8 hours of immersion in boiling water.

* * * * *

PO-1050
(5/69)

UNITED STATES PATENT OFFICE
CERTIFICATE OF CORRECTION

Patent No. 3,663,250          Dated May 16, 1972

Inventor(s)    Stephen A. Gerow and Verne Wesley Weidman

It is certified that error appears in the above-identified patent and that said Letters Patent are hereby corrected as shown below:

Column 8, line 24, "$SiO_2:Na_2$" should read --$SiO_2:Na_2O$--.

Column 8, line 72, "$SiO_2:Na_2$" should read --$SiO_2:Na_2O$--.

Column 10, line 1, "$SiO_2:Na_2$" should read --$SiO_2:Na_2O$--.

Column 10, line 3, "2.5:1" should read --2.6:1--.

Signed and sealed this 31st day of July 1973.

(SEAL)
Attest:

EDWARD M. FLETCHER, JR.      RENE D. TEGTMEYER
Attesting Officer            Acting Commissioner of Patents